United States Patent [19]

Shafer

[11] 4,179,192
[45] Dec. 18, 1979

[54] LASER FUSION OPTICAL SYSTEM
[75] Inventor: David R. Shafer, Fairfield, Conn.
[73] Assignee: The Perkin-Elmer Corporation, Norwalk, Conn.
[21] Appl. No.: 825,662
[22] Filed: Aug. 18, 1977

Related U.S. Application Data
[62] Division of Ser. No. 695,370, Jun. 14, 1976, abandoned.
[51] Int. Cl.² ............................................. G02B 5/10
[52] U.S. Cl. ..................................... 350/294; 176/1; 350/55; 350/299; 362/259
[58] Field of Search ............. 350/294, 299, 55; 176/1; 362/259, 246, 298

[56] References Cited
U.S. PATENT DOCUMENTS

| | | | |
|---|---|---|---|
| 3,244,073 | 4/1966 | Bouwers et al. | 350/294 |
| 3,437,954 | 4/1969 | Herriott et al. | 350/294 |
| 3,527,526 | 9/1970 | Silvertooth | 350/294 |
| 3,827,059 | 7/1974 | Rambauske | 350/294 |
| 4,017,163 | 4/1977 | Glass | 176/1 |

OTHER PUBLICATIONS

UCRL-50021-74, 3/75, pp. 238,239.
Applied Optics, vol. 13, No. 6, 6/74, pp. 1291-1292, Bakken.
Applied Optics, vol. 14, No. 6, 6/75, pp. 1274-1276, Brueckner et al.
Applied Optics, vol. 14, No. 6, 6/75, pp. 1267-1273, Thomas.

*Primary Examiner*—Harvey E. Behrend
*Attorney, Agent, or Firm*—S. A. Giarratana; F. L. Masselle; Edwin T. Grimes

[57] ABSTRACT

A laser optical system which includes a mirror system for forming a mirror cavity, a laser target disposed in this cavity, a plurality of focused laser beams directed into the cavity, and the mirror system being so arranged that each of the laser beams is reflected off the walls of the cavity a plurality of times prior to being focused on the laser target to thereby heat the target to a very high temperature.

2 Claims, 1 Drawing Figure

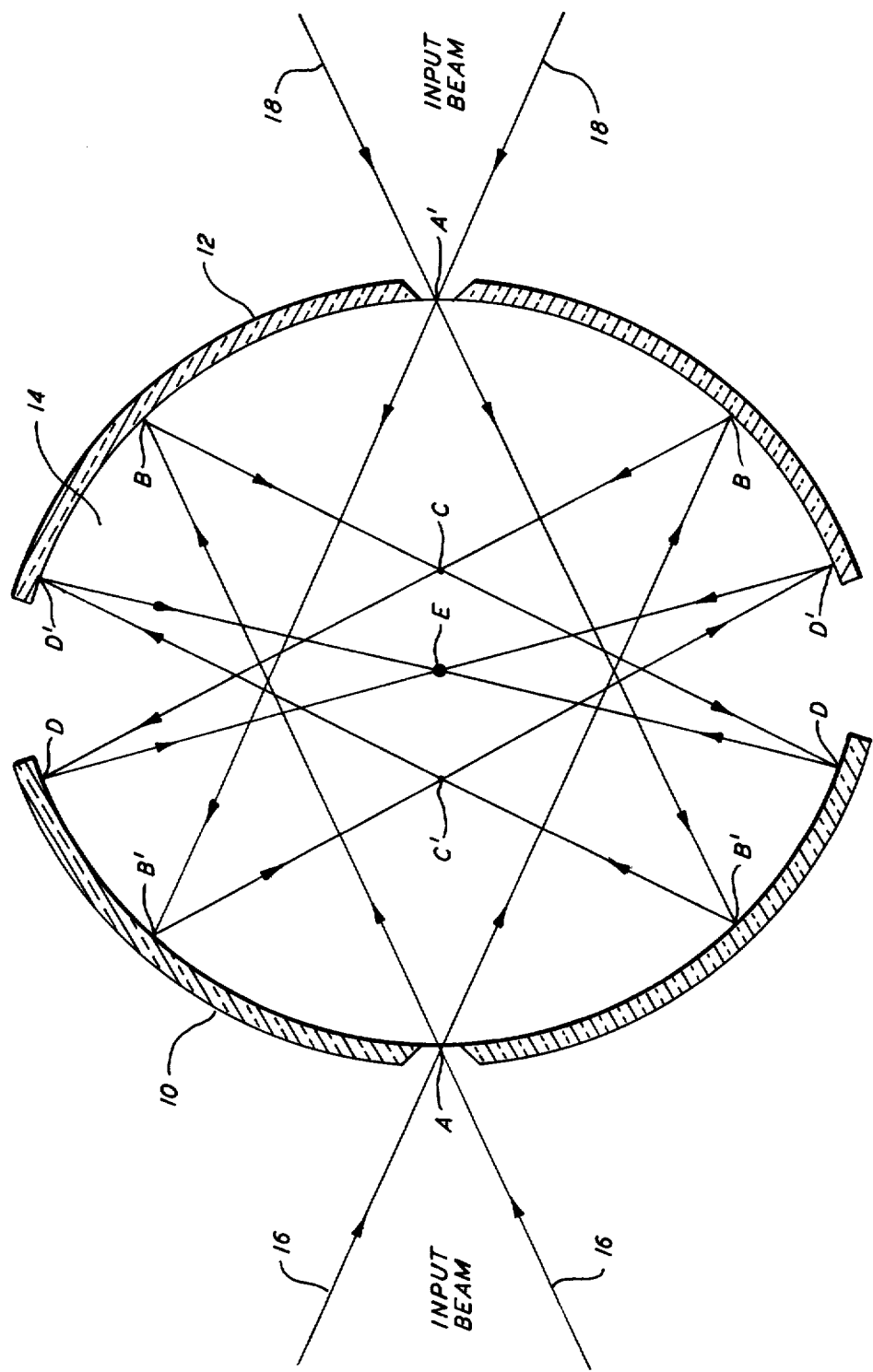

LASER FUSION OPTICAL SYSTEM

This is a division of application Ser. No. 695,370, filed June 14, 1976, now abandoned.

BACKGROUND OF THE INVENTION

This invention has to do with optical systems and more particularly to a laser optical focusing device.

In order to generate thermonuclear power by laser fusion, it is necessary to illuminate the fuel pellet, which is generally spherical and must be uniformly imploded to achieve the conditions necessary to ignite a fusion reaction. Thus, it is desirable to focus the laser beam substantially uniformly over the entire spherical surface of the fuel pellet and, in addition, it has been found desirable that the illumination be orthogonal to the fuel pellet surface to avoid refraction losses.

Further, it has been found to be desirable to divide the laser beam into a plurality of beams and to direct each beam toward the fuel pellet from a different angle. It has been known to use as many as nine beams, but such a system is fraught with difficulties due to the complexity and cost thereof.

In order to overcome the aforesaid problems, it has been proposed to employ an ellipsoidal mirror illumination system. Such a system is described by C. E. Thomas in an article entitled, "Laser Fusion Target Illumination System" appearing in the June 1975 issue of "Applied Optics", Vol. 14, No. 6. In the Thomas system two ellipsoidal mirrors are mounted in opposed relationship with the fuel pellet being placed therebetween. The second focus of each ellipsoid is designed to coincide with the wall of the opposing mirror so that a laser beam enters through a medial hole in each ellipsoid and reflects off the opposite ellipsoid onto the fuel pellet. While this system has been reasonably successful, the present invention is directed to improvements thereover, which will become apparent as the description proceeds.

SUMMARY OF THE INVENTION

In order to accomplish the desired results, this invention provides a new and improved laser optical syatem characterized by mirror means for forming a mirror cavity, a laser target disposed in the cavity, and means for directing one or more laser beams into said cavity. In addition, means are provided for reflecting each of the laser beams off the walls of the cavity a plurality of times and thence focusing it on the laser target. According to one aspect of the invention, each of the laser beams is reflected off the walls of the cavity twice, and thence focused on the laser target. In one form of my invention, there is provided a laser fusion optical system including, in combination, a pair of substantially identical ellipsoidal-shaped mirrors having the same radius and the same surface figure. These mirrors are disposed in opposed relationship to form a mirror cavity therebetween, and a laser target is centrally disposed in the cavity. Each of the mirrors has a medially disposed opening for receiving a focused laser beam. The mirrors are so arranged that each of the beams enters the mirror cavity and reflects off one mirror, which focuses the light at a point located between the target and said one mirror, from which it diverges and fills the other mirror, and the other mirror focuses it at the laser target.

BRIEF DESCRIPTION OF THE DRAWING

The FIGURE is an optical diagram of a laser focusing device, constructed in accordance with the concepts of this invention.

DETAILED DESCRIPTION OF THE PREFERRED EMBODIMENT

As illustrated in the drawing, there is provided a laser focusing device, which comprises two identical ellipsoidal mirrors 10 and 12 mounted in opposed, spaced relationship to form a mirror cavity indicated at 14. These two mirrors are identical and have the same radius and surface figure. A focused laser beam, indicated at 16, enters the cavity 14 through a small medially disposed opening at A and reflects off the first mirror 12, at B for the rays shown. This mirror focuses the light at C, from which it diverges and fills the second mirror 10, as indicated at D. It is noted that the point C is located between the laser target E and said first mirror 12. The second mirror focuses the light on the laser target or pellet at E. By selecting the proper mirror separation, the final focus at E will be midway between the two mirrors, so that an identical input beam, indicated at 18 can enter the system at A' and also focus at E. That is, the focused beam 18 enters the cavity 14 through the opening A' and reflects off mirror 10, at B', for the rays shown. This mirror focuses the light at C', from which it diverges and fills the mirror 12 at D'. Then the mirror 12 focuses the light on the laser target E. Proper asphericity on the mirrors, the same for both mirrors, ensures good image quality.

It should be particularly appreciated that, by means of this double reflection, or double-bounce arrangement, extra convergence angle amplification at the focus E is obtained, as compared to a single reflection or single-bounce cavity, such as the one described in the aforementioned Thomas article. The device, according to this invention, provides a very high speed focused light beam for experiments such as, for example, laser fusion experiments, without the need for an ultra-fast focused input beam. This is effected by means of the two reflections within the mirror cavity, as compared to the one reflection system employed by Thomas, which relaxes the input beam speed requirement by a substantial amount. As a result, the input beam focusing optics are simplified. Further, I have found that the surface asphericity required is substantially less with a double reflection cavity than with a single reflection cavity.

In certain installations it may be desirable to employ a system having three or more reflections in the cavity, but such systems have only a small advantage over the two reflection cavity system, described hereinbefore.

There has thus been described a new and improved laser focusing device, which provides a means for achieving a very high speed focused light beam by means of reflective optics. This is effected with only two optical surfaces, with a very small obscuration, and employs surface figure shapes that are relatively easy to fabricate. Although a specific embodiment has been illustrated and described, it will be obvious to those skilled in the art that various modifications may be made without departing from the spirit of the invention, which is intended to be limited solely by the appended claims.

What is claimed is:

1. A laser optical system comprising, in combination, a pair of concave mirrors having substantially the same radius and the same surface figure, said mirrors being disposed in opposed relationship to form a mirror cavity therebetween, a laser target centrally disposed in said cavity, means for directing a laser beam into said mirror cavity, said mirrors being spaced apart one with respect to the other and contoured so that said beam enters the mirror cavity and reflects off one mirror, which focuses the light at a point located in said cavity, from which it diverges and fills the other mirror, and the other mirror focuses it at said target to thereby heat said target.

2. A laser optical system comprising, in combination, a pair of substantially identical ellipsoidal shaped mirrors, said mirrors being disposed in opposed relationship to form a mirror cavity therebetween, a laser target centrally disposed in said cavity, each mirror having a small medially disposed opening for receiving a focused laser beam, said mirrors being spaced apart one with respect to the other and contoured so that each of said beams enters the mirror cavity and reflects off one mirror, which focuses the light at a point located between said target and said one mirror, from which it diverges and fills the other mirror, and the other mirror focuses it at said target to thereby heat said target.

* * * * *